(12) United States Patent
King et al.

(10) Patent No.: US 7,119,667 B2
(45) Date of Patent: Oct. 10, 2006

(54) INTEGRATED ELECTRONIC SECURITY SYSTEM FOR VEHICLE

(75) Inventors: Todd M King, Saginaw, MI (US); Ray G. Armstrong, Bay City, MI (US); Richard K. Riefe, Saginaw, MI (US); Scott A. Scherzer, Linwood, MI (US); Josh S. McDonald, Kawkawlin, MI (US)

(73) Assignee: Delphi Technologies, Inc., Troy, MI (US)

( * ) Notice: Subject to any disclaimer, the term of this patent is extended or adjusted under 35 U.S.C. 154(b) by 99 days.

(21) Appl. No.: 10/878,878

(22) Filed: Jun. 28, 2004

(65) Prior Publication Data

US 2005/0285722 A1      Dec. 29, 2005

(51) Int. Cl.
*B60R 25/10* (2006.01)

(52) U.S. Cl. .............................. 340/426.3; 340/426.31; 70/278.3; 74/606 R

(58) Field of Classification Search ........... 340/426.13, 340/426.3, 426.31, 426.36, 10.42, 10.5; 70/278.3, 70/408, 413; 74/606 R, 484 R
See application file for complete search history.

(56) References Cited

U.S. PATENT DOCUMENTS

| | | | |
|---|---|---|---|
| 5,398,532 A | 3/1995 | Janssen et al. ................ 70/252 |
| 5,632,168 A * | 5/1997 | Yano ......................... 70/278.3 |
| 5,724,028 A * | 3/1998 | Prokup ........................ 701/36 |
| 5,793,122 A | 8/1998 | Dingwall et al. .......... 307/10.3 |
| 6,237,378 B1 | 5/2001 | Canard ........................ 70/252 |
| 6,268,790 B1 | 7/2001 | Cregeur .................. 340/425.5 |
| 6,546,768 B1 | 4/2003 | Burghoff et al. .............. 70/252 |
| 6,578,449 B1 * | 6/2003 | Anspaugh et al. ........ 74/606 R |

* cited by examiner

*Primary Examiner*—Van T. Trieu
(74) *Attorney, Agent, or Firm*—Michael D. Smith

(57) ABSTRACT

A column shroud for covering a steering column including a shroud body. The shroud body has first and second portions connectable to one another about a steering column. The shroud body defines an opening in the first portion. An ignition receptor is accessible through the opening for receiving a pass key. The column shroud also includes a coil bobbin fixed to the shroud body adjacent to the opening. In the event of an attempted theft of the vehicle, the coil bobbin would be removed from the column in the event the shroud body is removed and the vehicle would be disabled.

8 Claims, 9 Drawing Sheets

… (1)

INTEGRATED ELECTRONIC SECURITY SYSTEM FOR VEHICLE

FIELD OF THE INVENTION

The invention relates to an ignition system for a vehicle and more particularly to an ignition system including a sensor for verifying the presence of a particular pass key in an ignition receptor.

BACKGROUND OF THE INVENTION

Vehicles include security systems to prevent unauthorized ignition of the vehicle engine. The most common type of security system is an ignition lock defining a slot to receive a key. The ignition lock will not turn unless the key is inserted in the slot and the vehicle will not start unless the ignition lock is turned. A more complicated security system includes a key recognition system in which the vehicle's key includes a transponder that communicates with a sensor in the vehicle. Each key is uniquely identifiable and unless the proper key is inserted in the ignition lock the vehicle will not start. Generally, the transponder associated with the key requires a magnetic field to communicate with the sensor and so a coil encircles the ignition lock to carry an electric current and generate a magnetic field.

SUMMARY OF THE INVENTION AND ADVANTAGES

The present invention provides a column shroud for covering a steering column including a shroud body. The shroud body has first and second portions connectable to one another about a steering column. Also, the shroud body defines an opening in the first portion. The column shroud also includes a coil bobbin fixed to the shroud body adjacent to the opening. In the event of an attempted theft of the vehicle, the coil bobbin would be removed from the column in the event the shroud body is removed and the vehicle would be disabled.

The present invention also provides an ignition assembly. The ignition assembly includes a shroud body having an opening. The shroud body of the ignition assembly can have one or more portions. The ignition assembly also includes an ignition receptor accessible through said opening for receiving a pass key. Also, a coil bobbin is fixed to the shroud body adjacent to the opening.

The present invention also provides a steering column assembly. The steering column assembly includes the ignition assembly set forth in greater detail above. The steering column assembly also includes a column member with an aperture. The opening of the shroud body is aligned with the aperture of the column member and the shroud body covers the column member. The ignition receptor is disposed in the aperture and is accessible through the opening for receiving a pass key. The coil bobbin fixed to the shroud body adjacent to the opening.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
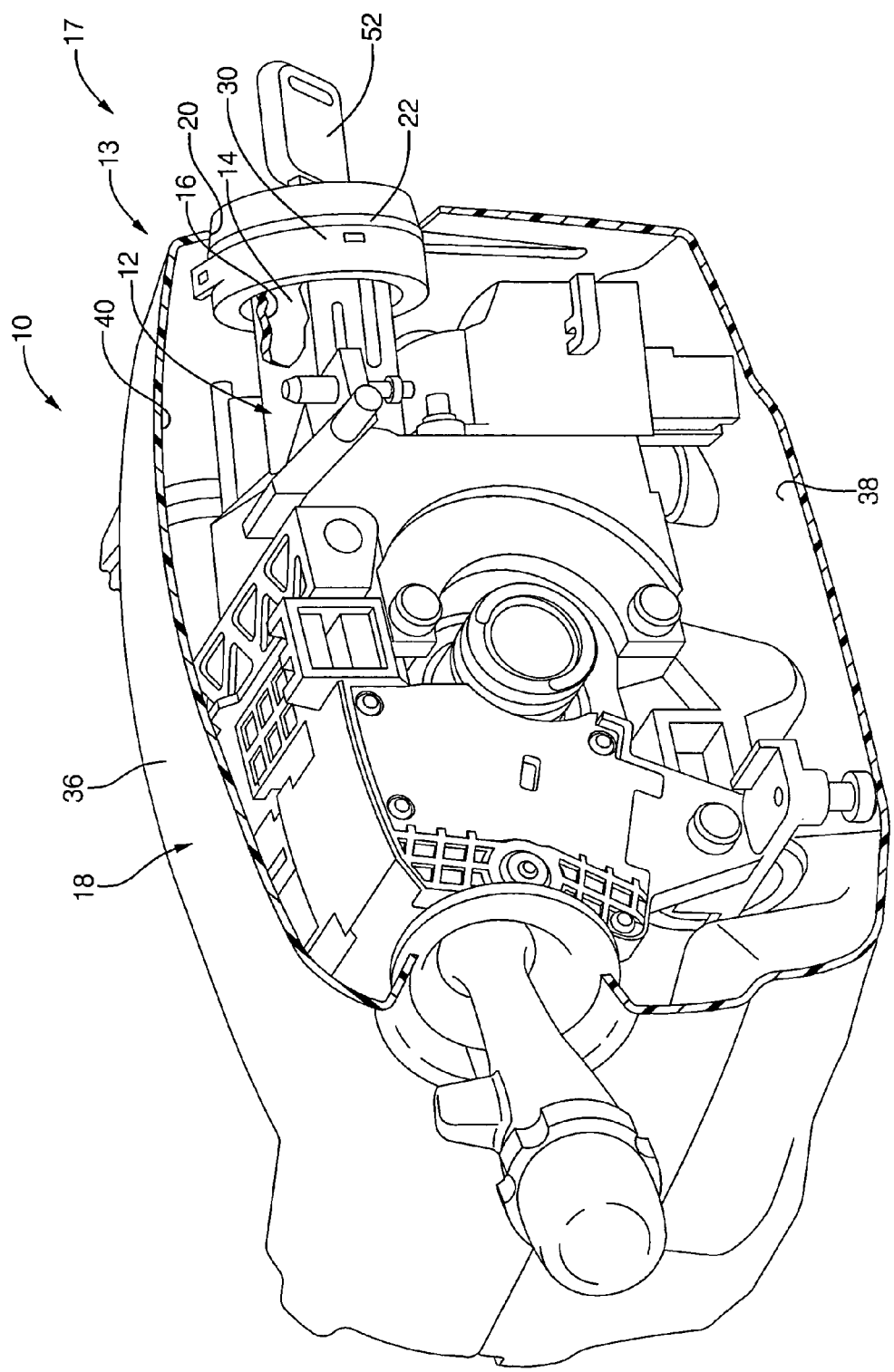
FIG. 1 is a perspective view of a first exemplary embodiment of the invention.
Figure 2:
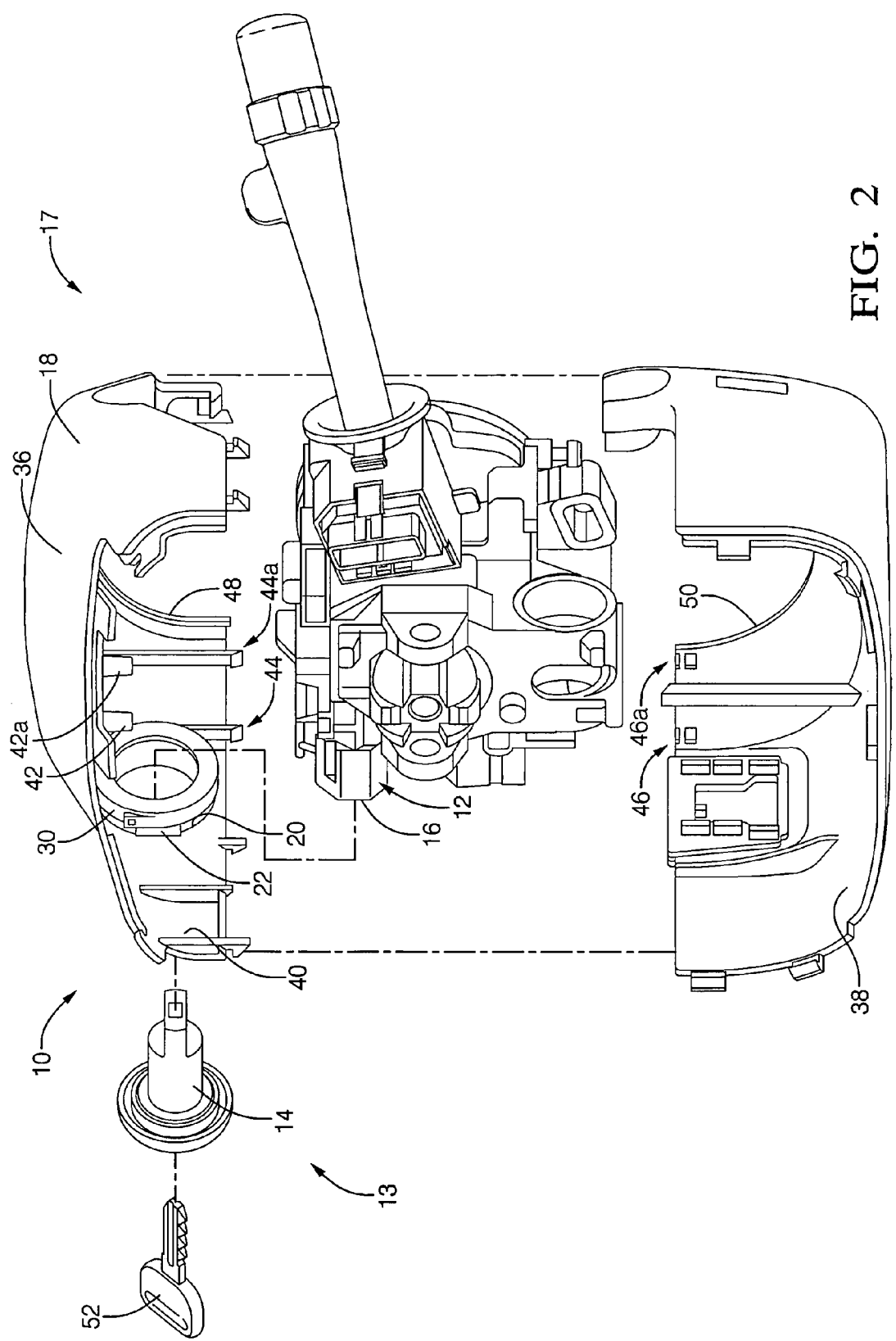
FIG. 2 is an exploded view of the first exemplary embodiment.

The present invention provides a security system for a vehicle. The security system of the exemplary embodiment of the invention includes a key recognition system. Referring now to FIG. 1, the key recognition system includes a key 52 having a transponder for communicating with a sensor (not shown) disposed in the vehicle. The sensor can be disposed on the column, in the dash, or somewhere else in the vehicle. The transponder of the key 52 communicates with the sensor by being inserted in an ignition receptor 14 and by then being subjected to a magnetic field. The magnetic field is generated by directing an electric current around the key 52. In the exemplary embodiment of the invention, the electric current is passed through a coil bobbin 22 that is fixed to a shroud body 18 that covers the ignition receptor 14.

Referring additionally to FIGS. 2–5, the first exemplary embodiment of the invention includes a steering column assembly 10 having a column shroud 17 for covering the ignition receptor 14. The ignition receptor 14 is supportably positioned in an aperture 16 defined by a steering column member 12. The column shroud 17 includes the shroud body 18 that includes a first portion 36 and a second portion 38. The first and second portions 36, 38 are connectable to one another about the steering column member 12. The first portion defines an opening 20 that is aligned with the ignition receptor 14 when the shroud body 18 is covering the steering column member 12.

The column shroud 17 also includes the coil bobbin 22 that is fixed to the shroud body 18 adjacent to the opening 20. In alternative embodiments of the invention, the column shroud 17 could include a shroud body having a single portion or a shroud body having more than two portions. For example, if the ignition receptor were located in the dashboard, the shroud body 18 could be defined by a single portion.

At least one of the first and second portions 36, 42 include aligning posts to increase the likelihood that the opening 20 will be disposed adjacent to the ignition receptor 14 when the shroud body 18 covers the steering column. In the exemplary embodiment, the first portion 36 includes an inner surface 40 and a plurality of aligning posts 42, 42a extending from the inner surface 40. The posts 42, 42a engage apertures (not shown) defined by the steering column member 12 when the shroud body 18 covers the steering column member 12.

The first and second portions 36, 38 are connected to one another with a plurality of snap connectors 44, 44a and snap connector receives 46, 46a. The snap connectors 44, 44a and the snap connector receivers 46, 46a cooperate with one another in a snap fit relation. Preferably, the snap fit is a permanent snap fit. The connectors 44, 44a and the receivers 46, 46a can be arranged such that all of the connectors 44, 44a are disposed on one of the portions 36, 38 or both receivers 46, 46a and connectors 44, 44a can be disposed on both of the portions 36, 38.

The first portion 36 defines a second opening 48 and the second portion 38 defines a third opening 50. The second and third openings 48, 50 are aligned with one another when the first and second portions 36, 38 are connected together. A portion of the steering column (not shown) extends through the openings 48, 50 when the shroud body 18 covers the steering column.

The first exemplary embodiment also includes an ignition assembly 13. The ignition assembly 13 includes the shroud body 18, the coil bobbin 22 that is fixed to the shroud body 18 adjacent to the opening 20, and the ignition receptor 14. The key 52 can access the ignition receptor 14 through the opening 20.

Figure 3:
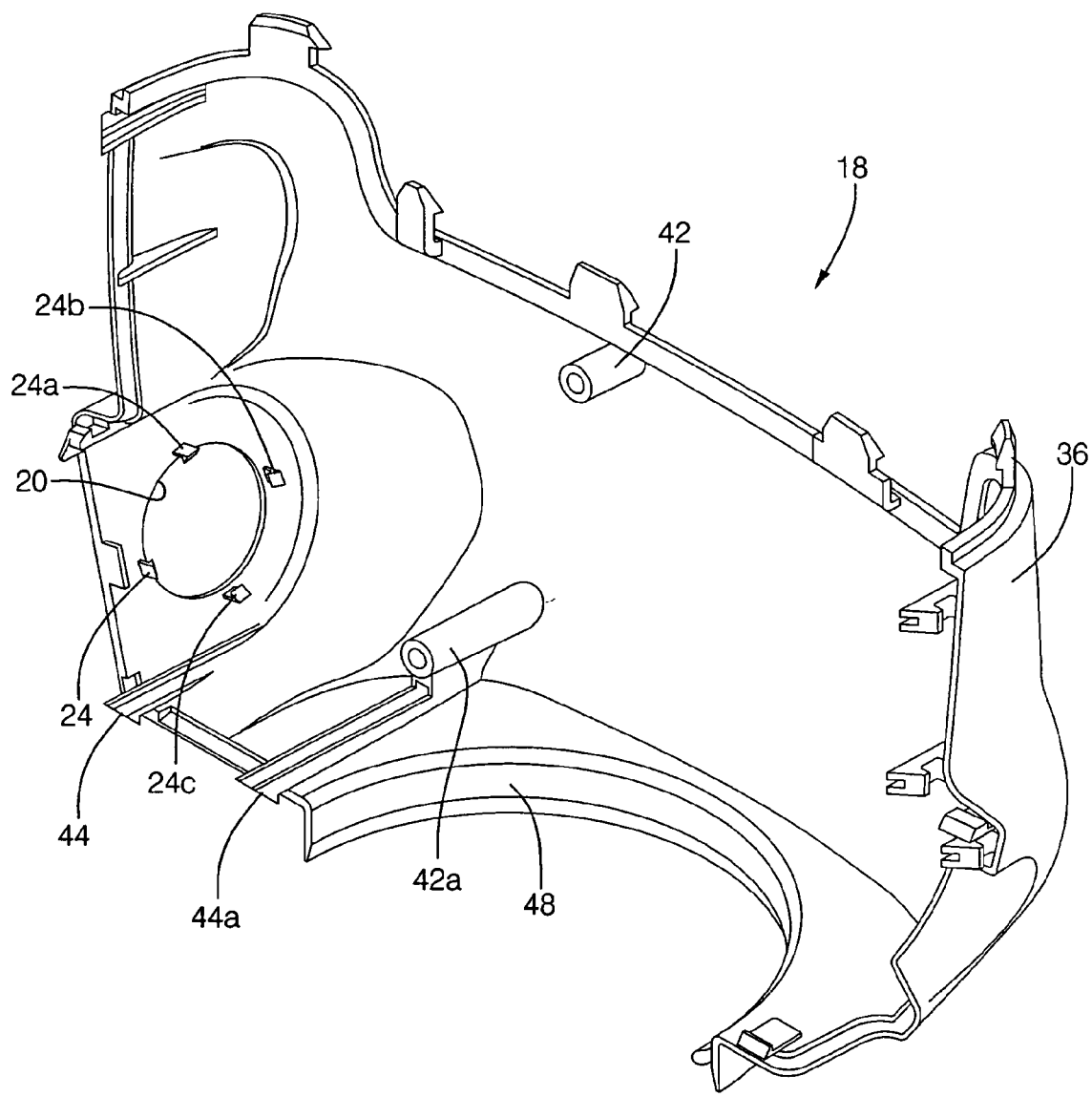
FIG. 3 is a perspective view of a shroud body according to the first exemplary embodiment.
Figure 4:
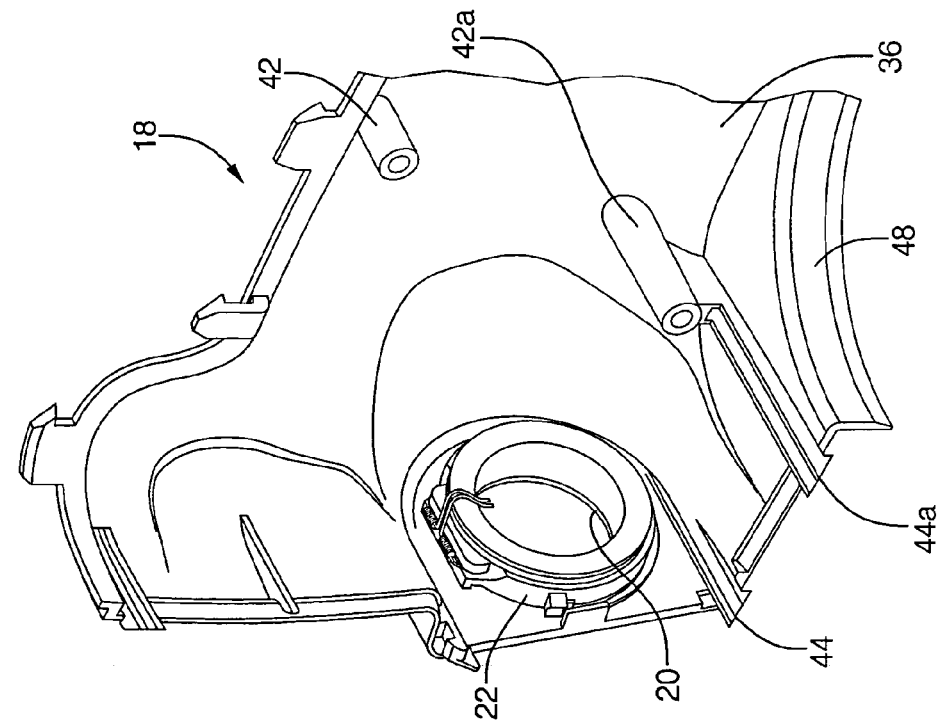
FIG. 4 is a perspective view of the shroud and a coil bobbin fixedly connected to one another.
Figure 6:
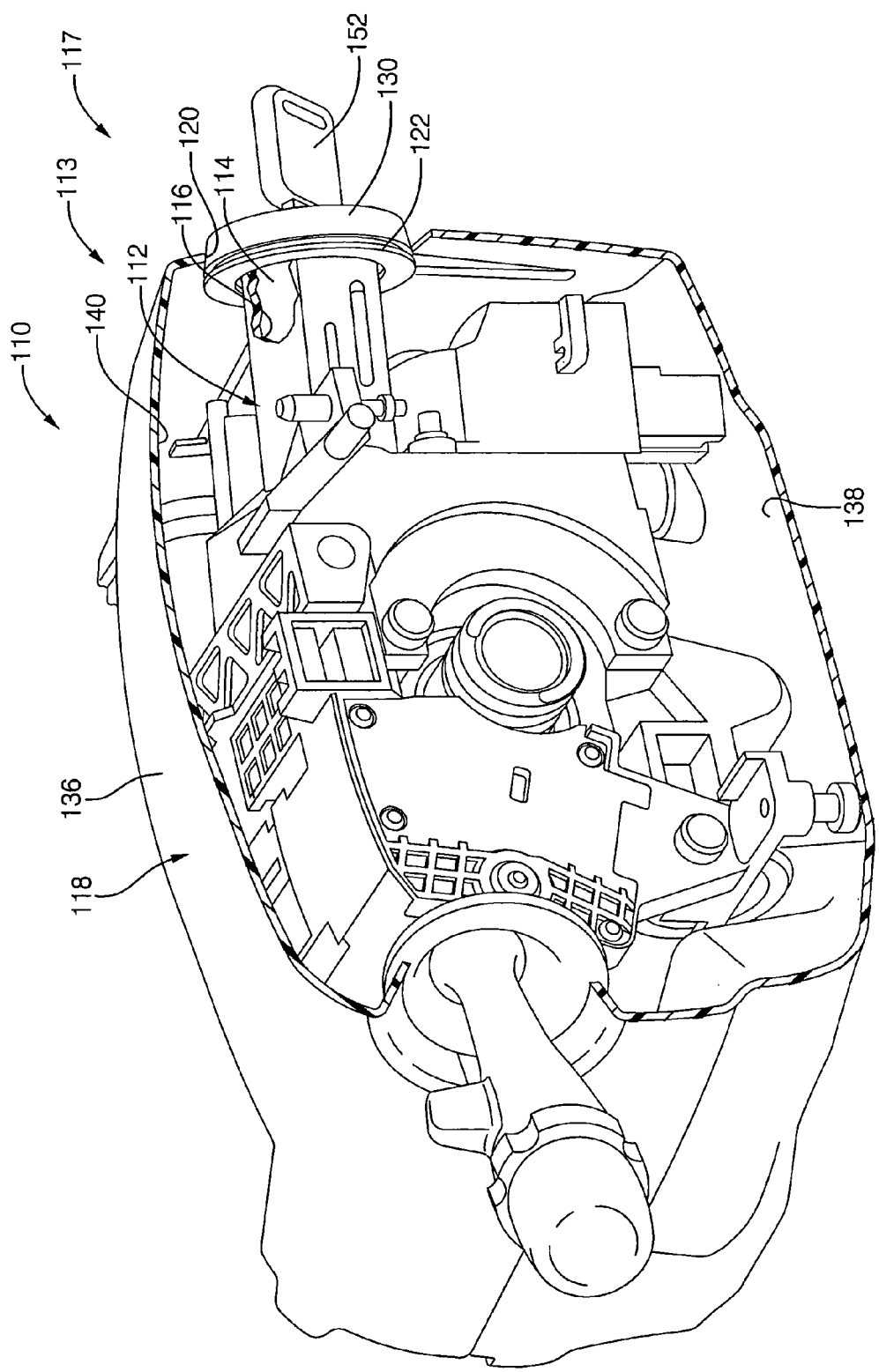
FIG. 6 is a perspective view of a second exemplary embodiment of the invention.
Figure 7:
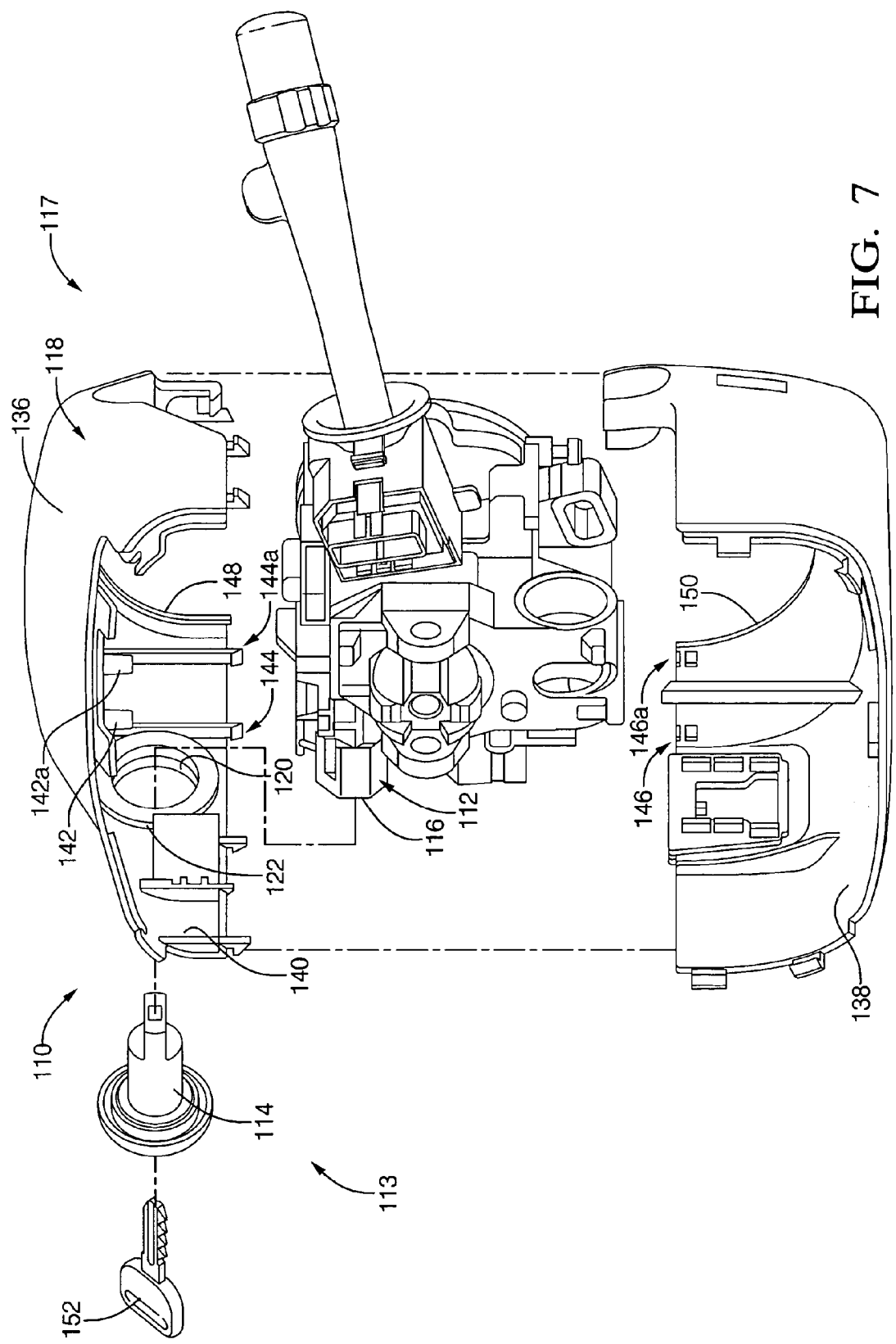
FIG. 7 is an exploded view of the second exemplary embodiment.

As best shown in FIGS. 3 and 4, in the first exemplary embodiment of the invention, the coil bobbin 22 and the shroud body 18 are connected to one another in snap-fit relation. The first portion 36 of the shroud body 18 defines a plurality of posts 24, 24a, 24b, 24c disposed around the opening 20. The posts 24, 24a, 24b, 24c define snap connectors that engage snap receivers (not shown) in the coil bobbin 22.

Figure 5:
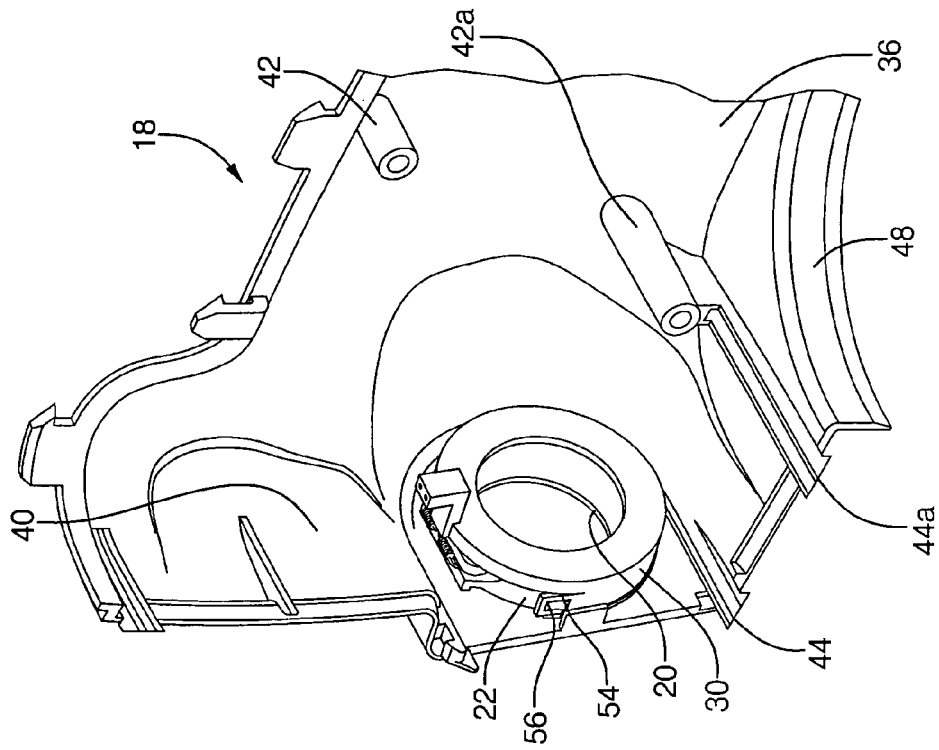
FIG. 5 is a perspective view of the shroud, the coil bobbin and a controller fixedly connected to one another.

As best seen in FIG. 5, a controller 30 is engaged in snap-fit relation to the coil bobbin 22. The coil bobbin 22 defines a snap connector 54 and the controller 30 defines a snap receiver 56. The controller 30 selectively directs an electric current to a coil of the coil bobbin 22 to create a magnetic field and communicate with the transponder of the key 52 (shown in FIGS. 1 and 2). The controller 30 can also include a sensor for receiving a signal from the transponder, as well as appropriate circuitry for disabling the vehicle's ignition system if the signal from the transponder is not received. In other words, the controller 30 can define an break in the vehicle's ignition circuit that is closed only when the appropriate key 52 is in the ignition receptor 14.

Referring now to FIGS. 6–10, a second exemplary embodiment of the invention includes a column shroud 117 having a shroud body 118 and a coil bobbin 122. The shroud body 118 includes first and second portions 136, 138 connected to one another. The first portion 136 defines an inner surface 140 and aligning posts 142, 142a extend from the inner surface 140 for connecting to a steering column member 112. The first and second portions 136, 138 include a plurality of snap connectors 144, 144a and snap connector receivers 146, 146a to engage one another. The first portion 136 defines an opening 120 and a second opening 148. The second portion 138 defines a third opening 150. The column shroud 117 can be part of an ignition assembly 113. The ignition assembly 113 also includes an ignition receptor 114 disposed in an aperture 116 of a column member 112. The column member 112 and the ignition assembly 113 form a steering column assembly 110. A key 152 is insertable in the ignition receptor 114 to start the vehicle. The various components of the second exemplary embodiment of the invention set forth above operate similarly with respect to the corresponding components of the first exemplary embodiment of the invention. In other words, similar features of the invention have been numbered with a common two-digit reference numeral and have been differentiated by a third digit placed before the two common digits, such as key 52 and key 152.

Figure 8:
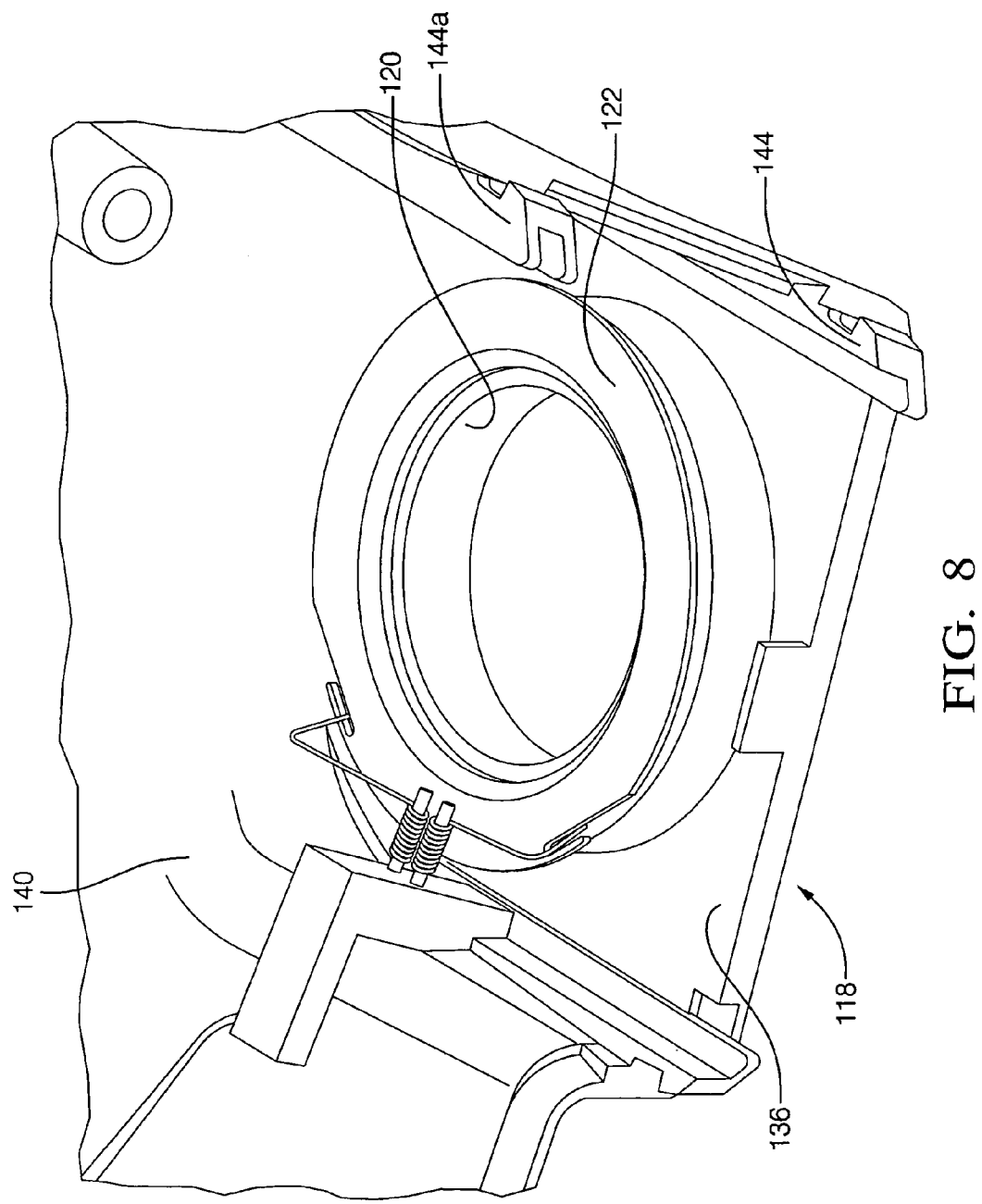
FIG. 8 is a perspective view of a shroud body according to the second exemplary embodiment and a coil bobbin disposed in situ with respect to the shroud body.

As best shown in FIG. 8, in the second exemplary embodiment of the invention, the shroud body 118 is plastic and the coil bobbin 122 is disposed in situ with respect to the shroud body 118. In other words, the coil bobbin 122 is disposed in a mold for forming the shroud body 118 and plastic is injected into the mold to cover the coil bobbin 122 and form the shroud body 118. Alternatively, the coil bobbin 122 can be inserted into a mold for forming only the first portion 136 of the shroud body 118, rather than a mold for forming both the first and second portions 136, 138.

Figure 9:
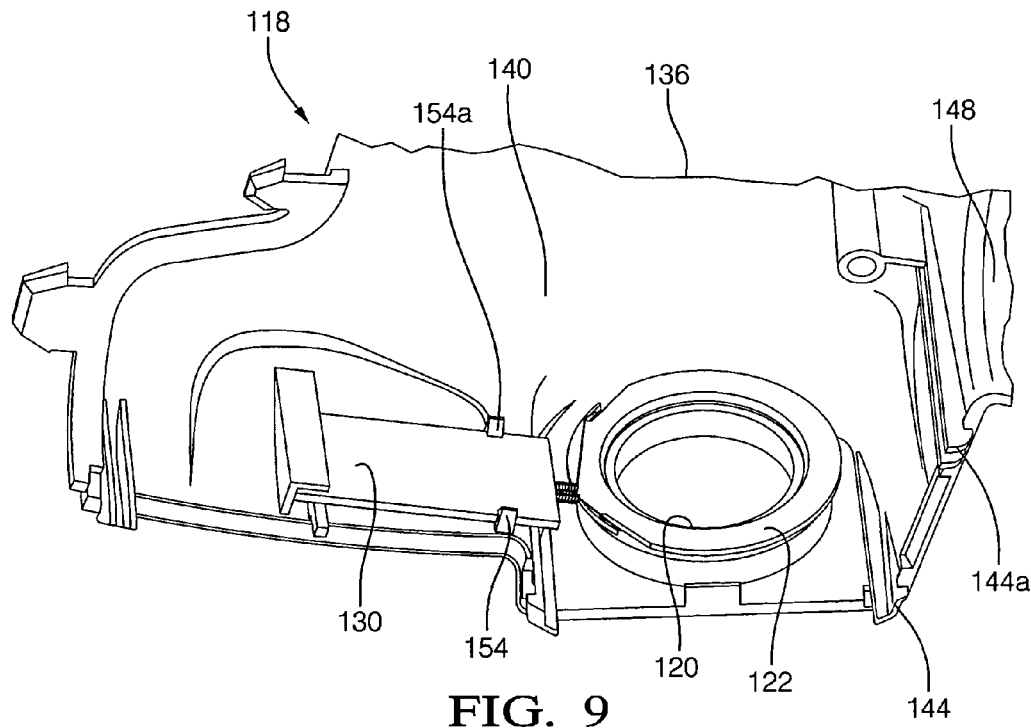
FIG. 9 is a perspective view of the shroud body and a controller fixedly mounted to the shroud body.
Figure 10:
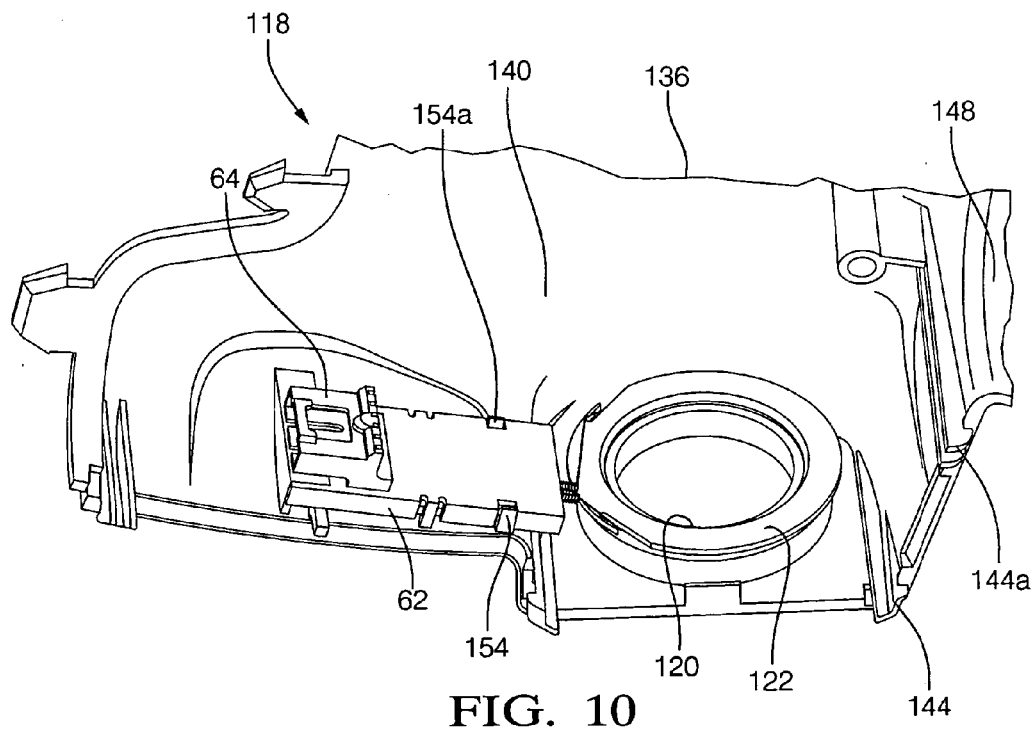
FIG. 10 is a perspective view of the shroud body and a covering for the controller to form an electric connection.

As best shown in FIGS. 9 and 10, a controller 130 is fixedly connected to the shroud body 118 and disposed in electric communication with coil bobbin 122. The connector 130 can be connected to the shroud body 118 with a plurality of snap connectors 154, 154a. A cover 62 covers the controller 130 and defines a wire harness connecting portion 64 for connecting to a plurality of wires associated with the vehicle ignition system. The cover 62 can be fixedly connected to the shroud body 118 with the snap connectors 154, 154a.

Figure 11:
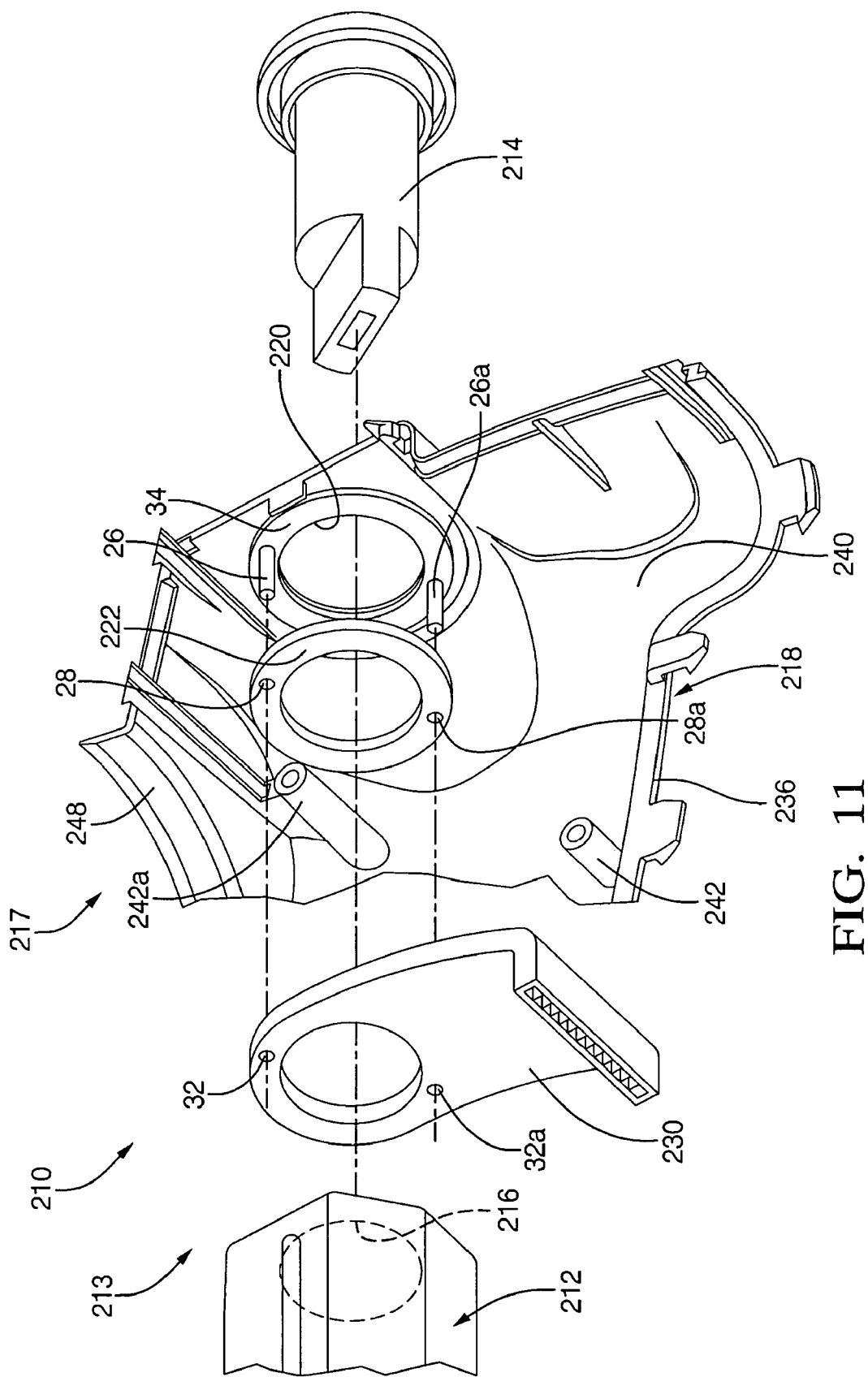
FIG. 11 is a schematic exploded view of a third exemplary embodiment of the invention.

Referring now to FIG. 11, a third exemplary embodiment of the invention includes a column shroud 217 having a shroud body 218 and a coil bobbin 222 connected to one another. The shroud body 218 includes first and second portions, such as portion 236, connected to one another. The first portion 236 defines an inner surface 240 and aligning posts 242, 242a extend from the inner surface 240 for connecting to a steering column member 212. The first portion 236 defines an opening 220 and a second opening 248. The column shroud 217 can be part of an ignition assembly 213. The ignition assembly 213 also includes an ignition receptor 214 disposed in an aperture 216 of a column member 212. The column member 212 and the ignition assembly 213 form a steering column assembly 210. A key is insertable in the ignition receptor 214 to start the vehicle. The various components of the third exemplary embodiment of the invention set forth above operate similarly with respect to the corresponding components of the first exemplary embodiment of the invention. In other words, similar features of the invention have been numbered with a common two-digit reference numeral and have been differentiated by a third digit placed before the two common digits, such as shroud body 18 and shroud body 218.

The ignition assembly 213 includes a member 34 defining a plurality of posts 26, 26a. The member 34 is electrically conductive. The member 34 can be connected to the shroud body 218 with adhesive or can be disposed in situ with respect to the shroud body 218. The coil bobbin 222 includes a first terminal 28 defining an aperture and a second terminal 28a defining an aperture. The coil bobbin 222 is slidably received by the member 34 by inserting the post 26 in the terminal 28 and by inserting the post 26a in the terminal 28a. A controller 230 is also slidably received by the member 34. The controller 230 includes a first terminal 32 defining and aperture and a second terminal 32a defining an aperture. The controller 230 selectively directs a current through the coil bobbin 222 by directing a current through the post 26, 26a. In operation, the coil bobbin 220 and the controller 230 are fixed to the shroud body 218 after being slidably engaged with the member 34. For example, push nuts could be slidably received by the posts 26, 26*a* to substantially fix the positions of the controller 230 and the coil bobbin 222.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An ignition assembly comprising:
   a shroud body having an opening;
   an ignition receptor accessible through said opening for receiving a pass key;
   a coil bobbin fixed to said shroud body adjacent said opening; and
   a plurality of posts mounted to said shroud body and disposed around said opening with said coil bobbin being connected to said plurality of posts.

2. The ignition assembly of claim 1 wherein said plurality of posts are further defined as being electrically conductive and said coil bobbin includes a first terminal defining an aperture in electric communication with a first one of said plurality of posts and said coil bobbin also includes a second terminal defining an aperture in electric communication with a second one of said plurality of posts.

3. The ignition assembly of claim 1 wherein said coil bobbin and said plurality of posts are connected to one another in snap-fit relation.

4. The ignition assembly of claim 1 including a controller associated with said coil bobbin for selectively applying an electric current through said coil bobbin.

5. The ignition assembly of claim 4 wherein said controller is fixedly connected to said shroud body.

6. The ignition assembly of claim 5 wherein said controller is fixedly connected to said coil bobbin.

7. The ignition assembly of claim 4 wherein said plurality of posts are further defined as being a plurality of electrically conductive posts with said controller having a first terminal defining an aperture in electric communication with a first one of said plurality of posts and a second terminal defining an aperture in electric communication with a second one of said plurality of posts.

8. The ignition assembly of claim 7 wherein said coil bobbin includes a first terminal defining an aperture in electric communication with said first one of said plurality of posts and also includes a second terminal defining an aperture in electric communication with said second one of said plurality of posts.

\* \* \* \* \*